United States Patent [19]

Catcher

[11] Patent Number: 5,141,632
[45] Date of Patent: Aug. 25, 1992

[54] FLOATING DISC OIL SPILL CLEANUP APPARATUS

[76] Inventor: Mikie B. Catcher, 1515 Weaver St., Scarsdale, N.Y. 10583

[21] Appl. No.: 703,249

[22] Filed: May 20, 1991

[51] Int. Cl.⁵ .............................................. E02B 15/04
[52] U.S. Cl. ................................. 210/122; 210/242.3; 210/923
[58] Field of Search ................ 210/242.1, 242.3, 122, 210/923; 417/61, 569, 570

[56] References Cited

U.S. PATENT DOCUMENTS

| | | | |
|---|---|---|---|
| 249,054 | 12/1881 | Hunter | 417/569 |
| 349,951 | 9/1886 | Patten, Jr. et al. | 417/570 |
| 550,141 | 11/1895 | Smith et al. | 417/569 |
| 882,030 | 3/1908 | Traulsen et al. | 210/242.1 |
| 1,107,391 | 8/1914 | Welch | 210/242.3 |
| 3,532,219 | 10/1970 | Valdespino | 210/242.3 |
| 3,534,859 | 10/1970 | Amero et al. | 210/242.3 |
| 3,547,553 | 12/1970 | Stanfield | 210/242.3 |
| 3,578,171 | 5/1971 | Usher | 210/923 |
| 3,753,496 | 8/1973 | Boyd | 210/923 |
| 3,831,756 | 8/1974 | Bhuta et al. | 210/923 |
| 4,209,400 | 6/1980 | Mayes | 210/242.3 |

Primary Examiner—Stanley S. Silverman
Assistant Examiner—Christopher Upton
Attorney, Agent, or Firm—Baker, Maxham, Jester & Meador

[57] ABSTRACT

A portable skimming apparatus for skimming oil and/or other liquid from water surfaces comprising a pump for pumping liquid, a floating intake assembly for floating on a liquid surface includes a circular float, a circular plate secured coaxially within the float, central inlet connected by a flexible conduit to the pump, and a peripheral inlet spaced around inside the periphery of the circular float connected by a flexible conduit to the pump for receiving liquid from the liquid surface.

10 Claims, 3 Drawing Sheets

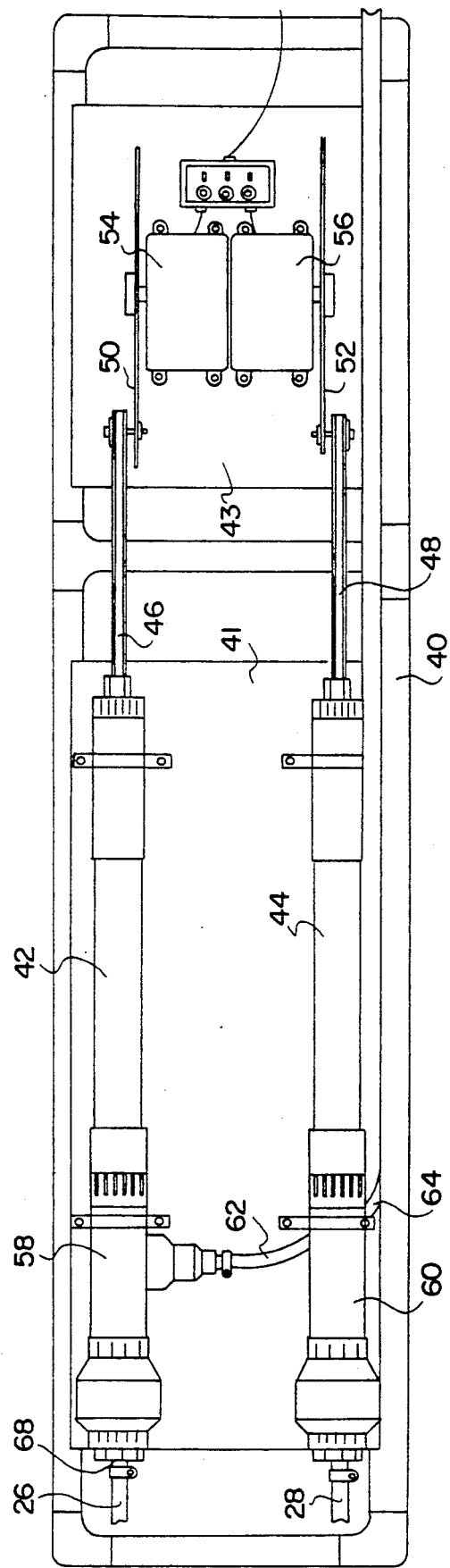

5,141,632

FLOATING DISC OIL SPILL CLEANUP APPARATUS

BACKGROUND OF THE INVENTION

The present invention relates to oil spill cleanup devices and pertains particularly to an improved oil spill cleanup apparatus.

Oil spills on the world's oceans and waterways are a frequent occurrence in modern times due to the high volume of petroleum, crude and other products transported over the waterways. The products of these oil spills are frequently swept by wind, waves and currents to the world's beaches and coastlines before they can be contained and recovered. It is desirable that the products of these spills be cleaned from the water surfaces and from the coastline as rapidly as possible.

Many coastline areas are remote and rugged with various conditions, including rocky shores and beaches, tide pools, and other conditions. Once oil has been swept to these areas, it is difficult to extract or recover and remove from the areas. Therefore, it is desirable that any spill be recovered from the water surface prior to reaching these areas.

Once a rugged coastline has been contaminated with oil and the like, the common practice is to attempt to clean the shores by means of straw or other absorbent materials placed over the areas in an effort to absorb the oil. The absorbent materials are then removed and disposed of.

The present invention was conceived and developed as an alternate and improved means of quickly extracting oil spills from water surfaces before they spread to shorelines and the like.

SUMMARY AND OBJECTS OF THE INVENTION

It is the primary object of the present invention to provide an environmentally safe and improved portable oil cleanup skimming pump system for rapidly and effectively skimming oil from water surfaces, including rivers, harbors and oceans.

In accordance with a primary aspect of the present invention, a cleanup apparatus for pumping oil and/or debris laden liquid from remote areas comprises a reciprocating piston pump, with an elongated tubular barrel having a distal end and a proximal end, an elongated plunger having a piston reciprocably mounted in said barrel, and a valving assembly detachably mounted on the distal end of said barrel, and comprising a flexible inlet conduit connected to a floating skimmer assembly having a central inlet port, and a peripheral inlet port, the pump barrel having a one-way inlet valve in an inlet port therein, and a one-way outlet valve in an outlet port therein.

BRIEF DESCRIPTION OF THE DRAWING

The above and other objects and advantages of the present invention will become apparent from the following description when read in conjunction with the accompanying drawings wherein:

FIG. 4 is a top plan view of the pump apparatus of FIG. 1; and

FIG. 5 a detailed partial view illustrating details of the pump units of the embodiment of FIG. 1.

DETAILED DESCRIPTION OF A PREFERRED EMBODIMENT

Figure 1:
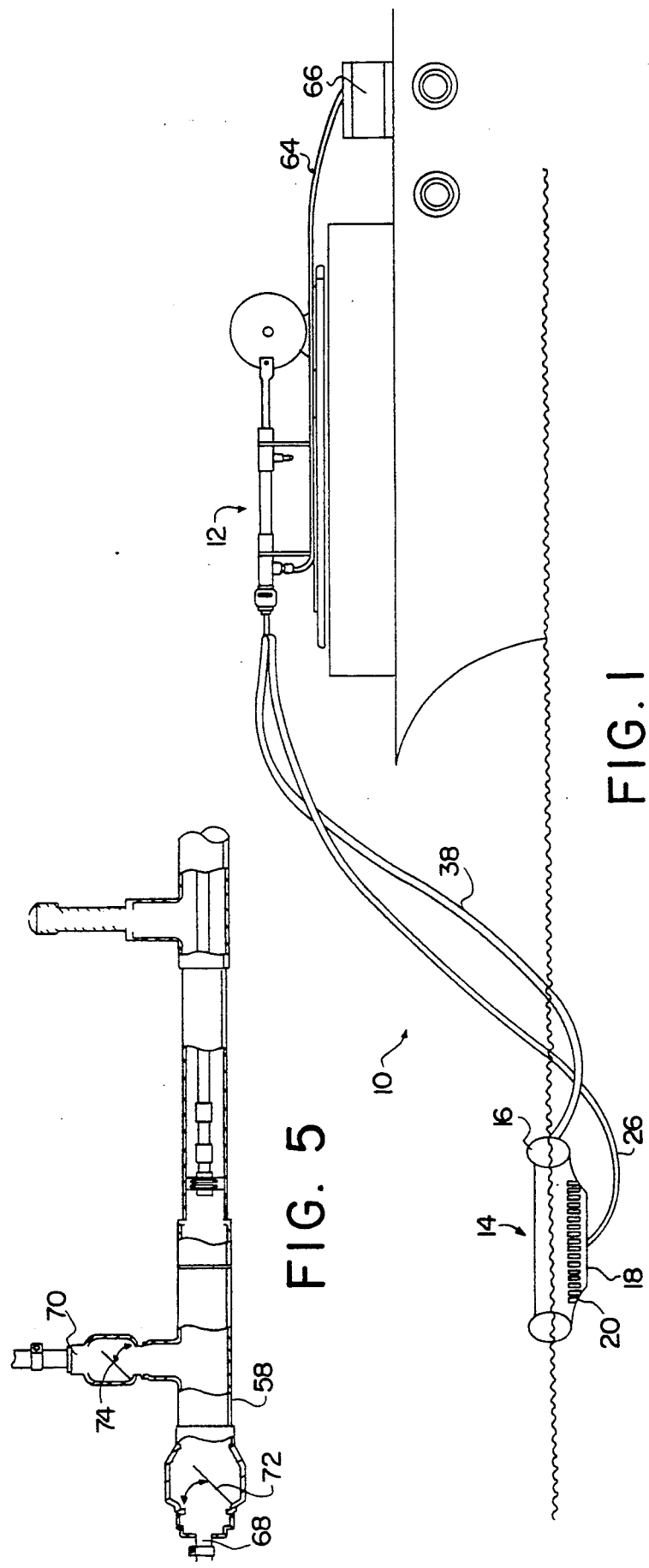
FIG. 1 is a side elevation view illustrating a preferred embodiment of the invention in operation from the deck of a ship.

Referring to the drawings, and particularly to FIG. 1, there is illustrated an exemplary embodiment of the present invention in operation from the deck of a ship. The invention, designated generally by the numeral 10, comprises a highly portable skimming system for skimming oil spills and other floating liquids from the surfaces and near surfaces of water and the like. The overall system, designated generally by the numeral 10, comprises a pump system designated generally by the numeral 12 and a remotely positionable floating skimmer intake system 14.

Figure 2:
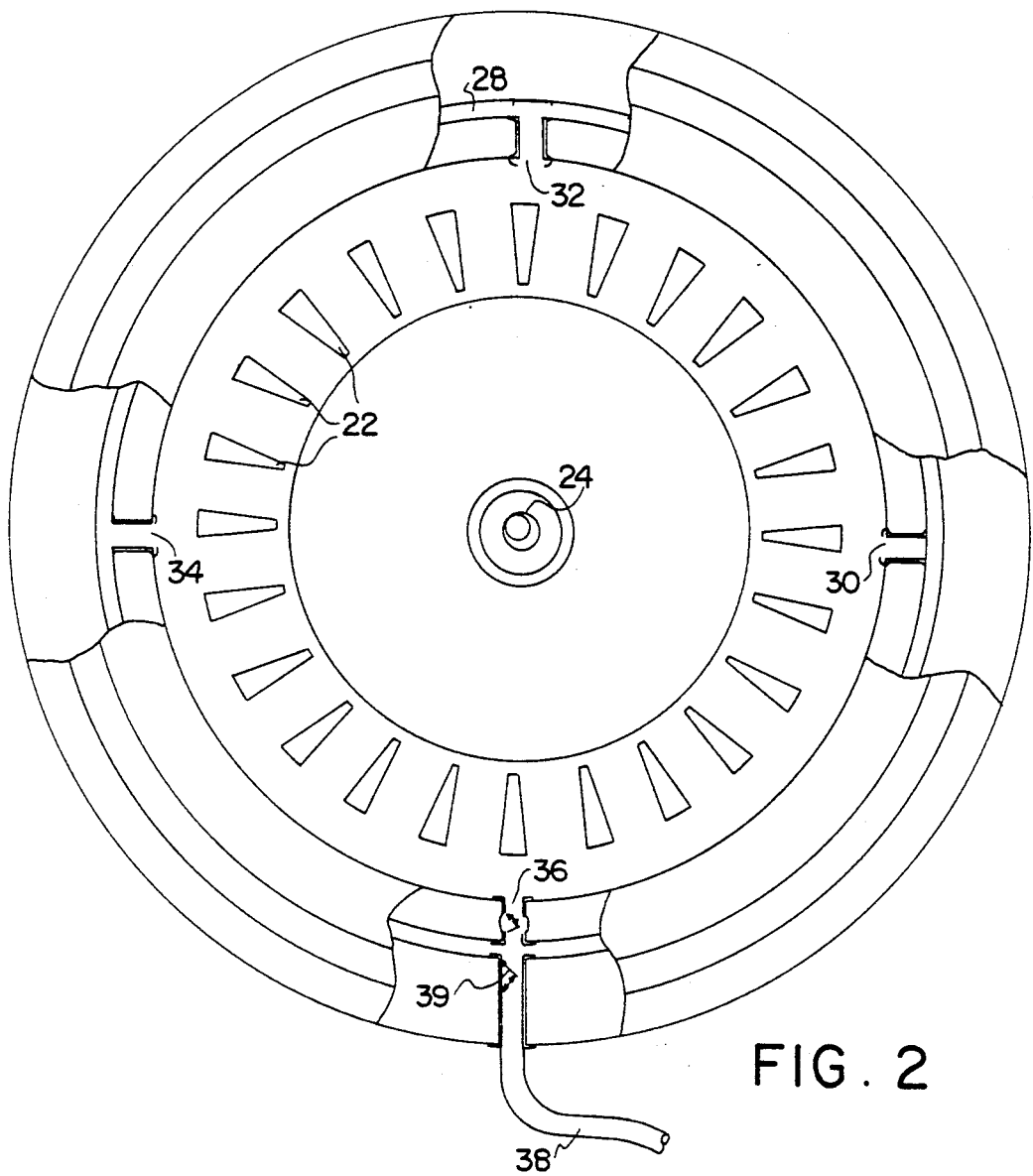
FIG. 2 is a top plan view of the skimmer unit of FIG. 1.
Figure 3:
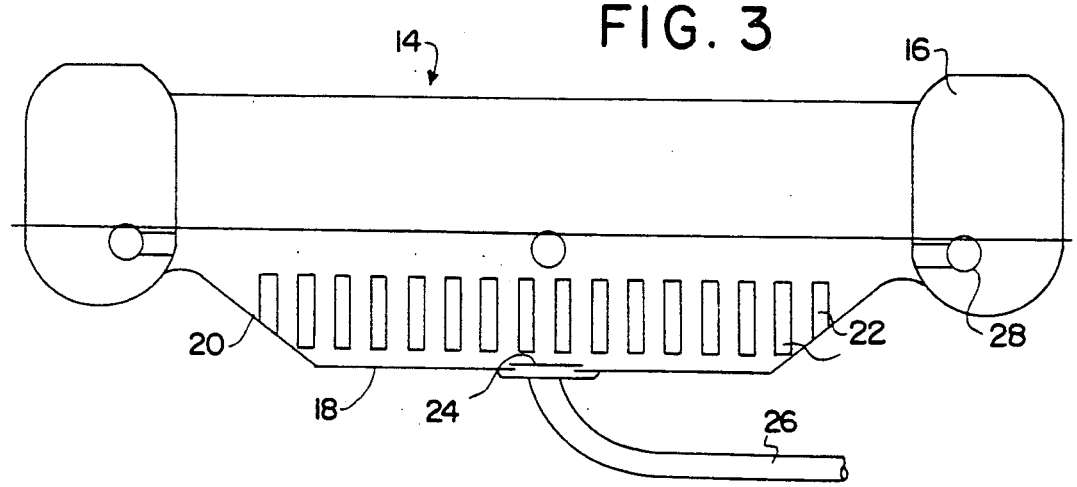
FIG. 3 is a section view taken generally on line 3—3 of FIG. 2.

Referring to FIGS. 2 and 3, the floating intake system comprises a floating assembly comprising a circular or peripheral float 16, which may be a ring of impervious foam or the like for supporting the skimming structure on or near the surface of a body of water or the like. Disposed within the float is a circular plate or disc 18 having slightly upwardly sloping peripheral edge 20 secured to and supported by the float 16 concentrically therewith. A plurality of slot openings 22 are formed in the upturned portion of the disc for admitting liquid from a water surface to the interior thereof. A central drain or intake opening 24 communicates with an elongated flexible tubing or conduit 26 to the pump assembly.

As shown in FIG. 3, the circular disc 18 is disposed slightly below the circular float 12, and the slots 22 therein permit the flow of surface liquids into the central area where it is skimmed off by the intake 24. A plurality of peripheral intake ports 30, 32, 34 and 36 are formed in a circular conduit 28, which is disposed inside the float 16 and positioned to be disposed at just slightly below the water surface. These intake ports draw surface oil and the like from the surface of water within the float. A similar peripheral conduit with similar intake ports may also extend around the outer periphery of the float assembly to draw surface liquids from the surrounding area. The peripheral intake assembly includes a plurality of the intake ports or slots 30-36 into the tubular ring 28. The tubular ring 28 communicates by way of an elongated tubular flexible conduit 38 to the pump assembly 12. A one-way flapper valve 39 may be provided at the inlet to intake ports or the intake lint 38 to prevent backflow. The floating skimmer unit 14 should be on the order of about twenty-five feet in diameter, but may be smaller or larger for certain applications.

The pump assembly, as shown in FIGS. 1 and 4, comprises a support base or frame 40, which may be designed to mount on any boat or other floating platform, or may be secured or mounted on the ground or docks on the shoreline. A pair of support decks 41 and 43 of marine plywood or the like are mounted on the frame 40 to support pump units. The elongated flexible lines 26 and 28 may be any suitable length to position the skimming intake assembly 14 in any suitable remote location from the pump assembly.

The pump assembly comprises a pair of piston pumps 42 and 44, each of which comprises an elongated tubular barrel having a connecting rod 46 and 48, respectively, connected at one end to a piston and at the other end to cranks 50 and 52.

The cranks 50 and 52 are driven by suitable motors 54 and 56 through a suitable gear drive assembly. Suitable gear drives and motors are available in the marketplace. Details of the drive motors and gear assembly are not believed necessary to provide a complete understanding of the invention and how to make and use it. The motors may be electric motors or other suitably powered motors. The pumps 42 and 44 are preferably barrels that are large in diameter having one or more pistons mounted within the barrel and connected by the respective connecting rods 46 and 48 to the cranks 50 and 52. Each of the pumps have a valve assembly 58 and 60 having an inlet and outlet port and valve assembly at one end of the respective barrels, as illustrated in FIG. 3. These pump assemblies and the valve therein are more fully disclosed and described in my co-pending application No. 07/470,371.

The outlets to the pumps are connected by way of elongated flexible lines or conduits 62 and 64 to a suitable holding tank or reservoir 66. These type piston pumps are preferable for this application, because they do not need priming, and any debris brought in with the skimming operation passes through the valve assembly without fouling the pistons, and without the necessity of passing through the pistons. The pumps can pump oil, water or combinations thereof along with air without interruption.

Referring to FIG. 5, an exemplary embodiment of the pump 42 and valve assemblies thereof is illustrated. As illustrated, the piston barrel 42 has a valve assembly 58 mounted on the end thereof. The valve assembly has an in line intake or inlet port 68 that is in line with the barrel, and an outlet port at 70 that is at ninety degrees to the barrel. The valve assemblies each have a flapper valve 72 and 74, respectively, that seat against a valve seat to prevent back flow. The flow through capacity of the valves is large and preferably on the order of close to that of the pump barrels themselves. The pumps are preferably constructed of non-corrosive materials, such as plastic and stainless steel. The pump barrels and valve assemblies may be constructed of polyvinyl chloride (PVC) or similar durable plastic. The above described system provides a simple, inexpensive, portable skimming system that can be stowed on tankers and other seagoing vessels that are likely to be in the vicinity of a spill. They may also be easily transported by aircraft or other means and deployed where needed. This eliminates the need for special skimmer ships or vessels that must travel great distances to the area of a spill.

In operation, the assembly, as illustrated in FIG. 1, is taken to the scene of an oil spill or the like, which preferably has been boomed off by floating booms to contain the spill. The pump assembly is supported on a boat or watercraft or other suitable support structure, while the skimming intake assembly 14 is positioned within the spill area by hand or other means. The intake assembly is connected by elongated flexible tubular conduits 26 and 28 to the pump assembly and permitted to float or move throughout the spill area, skimming water and oil from the surface thereof, and placing it in any suitable containers such as barrels or the like. The skimming unit 14 may also be moved about an area by means of a boat, aircraft or other suitable means. A large number of the skimmer units may be placed on a boat or other support structure and positioned or moved about a spill area.

Still further modifications of the device can include mounting of the device on suitable water vessels, such as boats, barges and the like, and powering the unit by motors, such as electrical or internal combustion engines. Suitable mechanical movement mechanisms, such as cranks and linkages, are known, which are capable of attachment to the plunger for operation thereof by conversion of the engines rotary motion to a reciprocating motion of the plunger.

While I have illustrated and described my invention by means of specific embodiments, it should be understood that numerous changes and modifications may be made therein without departing from the spirit and scope of the invention as defined in the appended claims. I further assert and sincerely believe that the above specification contains a written description of the invention and the manner and process of making and using it, in such full, clear, concise, and exact terms as to enable any person skilled in the art to which it pertains, or with which it is most nearly concerned, to make and use the same, and further that it sets forth the best mode contemplated by me for carrying out the invention.

I claim:

1. A portable skimming apparatus for skimming oil and/or other liquid from water surfaces comprising:
   pump means for pumping liquid;
   power means for powering said pump;
   a remotely positionable floating intake assembly comprising a circular ring shaped float, a circular plate secured coaxially with said float, a plurality of inlet slots around the periphery of said circular plate, an inlet opening in the center of said plate, and a plurality of inlet openings spaced around the inside periphery of said float for floating on a liquid surface remote from said pump means for receiving liquid from said liquid surface; and
   elongated flexible conduit means for connecting said floating intake assembly inlet openings to said pump means.

2. A skimming apparatus according to claim 1 wherein:
   said plurality of inlet openings comprises a circular conduit extending around the inside periphery of said float and having a plurality of inlet ports formed therein.

3. A skimming apparatus according claim 2 wherein said pump means comprises a support platform, a pair of elongated piston pumps mounted on said platform and each connected to a separate one of said central inlet means and peripheral inlet means via said flexible conduit means.

4. A skimming apparatus according claim 3 wherein said elongated piston pumps comprise an elongated tubular barrel, a piston reciprocably mounted in said barrel and an elongated connecting rod connecting the piston to a rotatable crank, said tubular barrel having an inlet valve and an outlet valve at one end thereof, said inlet valve and said outlet valve are each flapper valves having a flow through diameter substantially equal to the diameter of the respective barrel.

5. A portable skimming apparatus for skimming oil and/or other liquid from water surfaces comprising:
   pump means for pumping liquid;
   power means for powering said pump;
   a remotely positionable floating intake assembly for floating on a liquid surface for receiving liquid from said liquid surface comprising a circular ring-shaped float, a circular plate secured coaxially within said float, a plurality of inlet slots around the periphery of said circular plate, an inlet opening in the center of said plate, and peripheral inlet means including a plurality of inlet openings spaced around the inside periphery of said float; and elongated flexible conduit means for connecting said floating intake assembly central inlet opening and peripheral inlet means to said pump means.

6. A skimming apparatus according to claim 5 wherein: said peripheral inlet means comprises a circular conduit extending around the inside periphery of said float and having a plurality of inlet ports formed therein.

7. A skimming apparatus according claim 6 wherein said pump means comprises a support platform, a pair of elongated piston pumps mounted on said platform and each connected to a separate one of said central inlet means and peripheral inlet means via said flexible conduit means.

8. A skimming apparatus according claim 7 wherein said elongated piston pumps comprise an elongated tubular barrel, a piston reciprocably mounted in said barrel and an elongated connecting rod connecting the piston to a rotatable crank, said tubular barrel having an inlet valve and an outlet valve at one end thereof, said inlet valve and said outlet valve are each flapper valves.

9. A portable skimming apparatus for pumping oil and/or debris laden liquid from remote areas comprising:

a pump apparatus for pumping liquid, comprising an elongated tubular barrel having a distal end and a proximal end, an elongated plunger having a piston thereon reciprocably mounted in said barrel, a rotatable crank for reciprocating said plunger, a valving assembly detachably mounted on the distal end of said barrel and comprising a first tubular section aligned with said barrel, an inlet port, and an outlet port, a one-way inlet valve in said inlet port, and a one-way outlet valve in said outlet port, said inlet valve and said outlet valve are each flapper valves having a flow through diameter substantially equal to the diameter of said tubular barrel;

motor means for powering said pump;

a remotely positionable floating intake assembly for floating on a liquid surface remote from said pump apparatus for receiving liquid from said liquid surface comprising a circular ring shaped float, a circular plate secured coaxially within said float, central inlet means in said circular plate, and peripheral inlet means including a plurality of inlet ports spaced around the inside periphery of said circular float; and elongated flexible conduit means for connecting said floating intake assembly inlet means to said inlet port of said pump apparatus.

10. A skimming apparatus according to claim 9 wherein:

said peripheral inlet means comprises a circular conduit extending around the inside periphery of said float and having said plurality of inlet ports formed therein.

* * * * *